United States Patent
Beyer

(10) Patent No.: US 8,875,669 B2
(45) Date of Patent: Nov. 4, 2014

(54) HEAD GASKET HAVING VARIABLE AREA COOLANT OPENINGS

(75) Inventor: Theodore Beyer, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 288 days.

(21) Appl. No.: 13/457,899

(22) Filed: Apr. 27, 2012

(65) Prior Publication Data

US 2013/0284128 A1 Oct. 31, 2013

(51) Int. Cl.
*F02F 1/36* (2006.01)

(52) U.S. Cl.
USPC .................................. 123/41.82 R; 277/592

(58) Field of Classification Search
USPC ................. 123/41.82 R, 41.72, 193.3, 193.5; 277/313, 591–596, FOR. 248
See application file for complete search history.

(56) References Cited

U.S. PATENT DOCUMENTS

| | | | |
|---|---|---|---|
| 2,722,922 A | 11/1955 | Sheppard | |
| 4,365,593 A | 12/1982 | Pomfret | |
| 4,377,990 A | 3/1983 | Seidl | |
| 5,269,541 A * | 12/1993 | Inamura | 277/595 |
| 5,275,139 A * | 1/1994 | Rosenquist | 123/193.3 |
| 5,755,028 A | 5/1998 | Takami et al. | |
| 6,883,471 B1 | 4/2005 | Belter et al. | |
| 2010/0007095 A1 | 1/2010 | Klinner | |
| 2011/0181001 A1 | 7/2011 | Kameyama et al. | |

* cited by examiner

*Primary Examiner* — Hung Q Nguyen
(74) *Attorney, Agent, or Firm* — Julia Voutyras; Alleman Hall McCoy Russell & Tuttle

(57) ABSTRACT

An engine assembly is provided herein. The engine assembly includes a head gasket interposing a cylinder block and a cylinder head, the head gasket comprising a first layer in face sharing contact with a portion of a cylinder head attachment surface included in the cylinder block and having a first-layer coolant opening adjacent to two neighboring cylinders and a second layer having a second-layer coolant opening having a smaller cross-sectional area than the first-layer coolant opening.

19 Claims, 9 Drawing Sheets

HEAD GASKET HAVING VARIABLE AREA COOLANT OPENINGS

BACKGROUND/SUMMARY

Internal combustion engines may experience an increase in temperature during combustion operation. To mitigate thermal degradation to the engine, cooling systems have been developed to cool components in the engine, such as the cylinder block and the cylinder head.

U.S. Pat. No. 4,377,990 discloses a water-cooled internal combustion engine with a cylinder head water jacket in fluidic communication with a cylinder block water jacket. A head gasket is disposed between the cylinder head and the cylinder block. The head gasket includes water galleries enabling coolant to flow through the gasket and between passages in the cylinder head and the cylinder block.

However, the inventors have recognized several drawbacks with cooling approaches such as the example above. For example, the location, size, and geometry of the water galleries in the head gasket may not provide sufficiently controlled cooling to certain sections of the cylinder head and the cylinder block, creating a potential for temperature above a desired operating value during engine operation. For example, the bridges between cylinders may experience less cooling than other areas of the cylinder block and the cylinder head, such as the exhaust manifold. As a result, uneven cooling in the cylinder block and/or cylinder head may lead to warping, cracking, as well as other types of thermal degradation. Furthermore, over-temperature conditions in some areas in the cylinders may decrease combustion efficiency and increase emissions. Further still, over-temperature conditions at bore bridge locations may increase head gasket degradation and top piston ring wear.

As such, in one approach an engine assembly is provided. The engine assembly includes a head gasket interposing a cylinder block and a cylinder head, the head gasket comprising a first layer in face sharing contact with a portion of a cylinder head attachment surface included in the cylinder block and having a first-layer coolant opening adjacent to two neighboring cylinders and a second layer having a second-layer coolant opening having a smaller cross-sectional area than the first-layer coolant opening.

In this way, the first-layer coolant opening may be sized and positioned to provide desired cooling to selected areas of the engine without necessarily compromising the structural integrity of the cylinder head and/or cylinder block through the addition of extra passages (although extra passages may be added, if desired). As a result in one embodiment, desired cooling may be provided to the bore bridge, enabling the bore bridge temperature to be maintained within limits during engine operation. Increasing the cross-sectional area of the first-layer coolant opening increases the amount of coolant that may be flowed near the cylinder block and specifically the bore bridge, thereby increasing the cooling provided to the bore bridge, if desired. Additionally, increasing the cross-sectional area of the first-layer coolant opening generates increased turbulence in the coolant flowing through the opening during some operating conditions. Therefore, the amount of heat that may be transferred to the coolant is increased. Additionally, increasing the cross-sectional area of the first-layer opening enables the coolant to travel across a greater amount of the cylinder block. Consequently, the thermal variability in the cylinder head and/or cylinder block may be decreased, thereby decreasing the likelihood of warping or other thermal degradation of the cylinder block and/or cylinder head.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIGS. 2-8 are drawn approximately to scale.

DETAILED DESCRIPTION

A layered head gasket having a column of openings with a variable cross-sectional area of the openings is described herein. Specifically, the cross-sectional area of the column decreases in a downstream direction through the head gasket and is positioned adjacent to a bore bridge in the engine assembly. An exterior block interfacing layer in the head gasket may include a block interfacing layer coolant opening which extends from a first cylinder sealing bead to a second cylinder sealing bead. Each of the cylinder sealing beads is included in the exterior block interfacing layer and encloses separate neighboring cylinders. In this way, increased coolant may flow next to the bore bridge in the cylinder block, thereby decreasing bore bridge temperatures, as well as decreasing thermal variability in the engine assembly. Moreover, the manufacturing cost of the engine assembly may be decreased when the cross-sectional area of the first-layer coolant opening is increased when compared to engine assemblies that may provide additional coolant passages in the cylinder block via tooling (e.g., drilling, saw cuts, etc.) at a late stage in the manufacturing process. However, additional coolant passages may be provided in the cylinder block, if desired.

Figure 1:
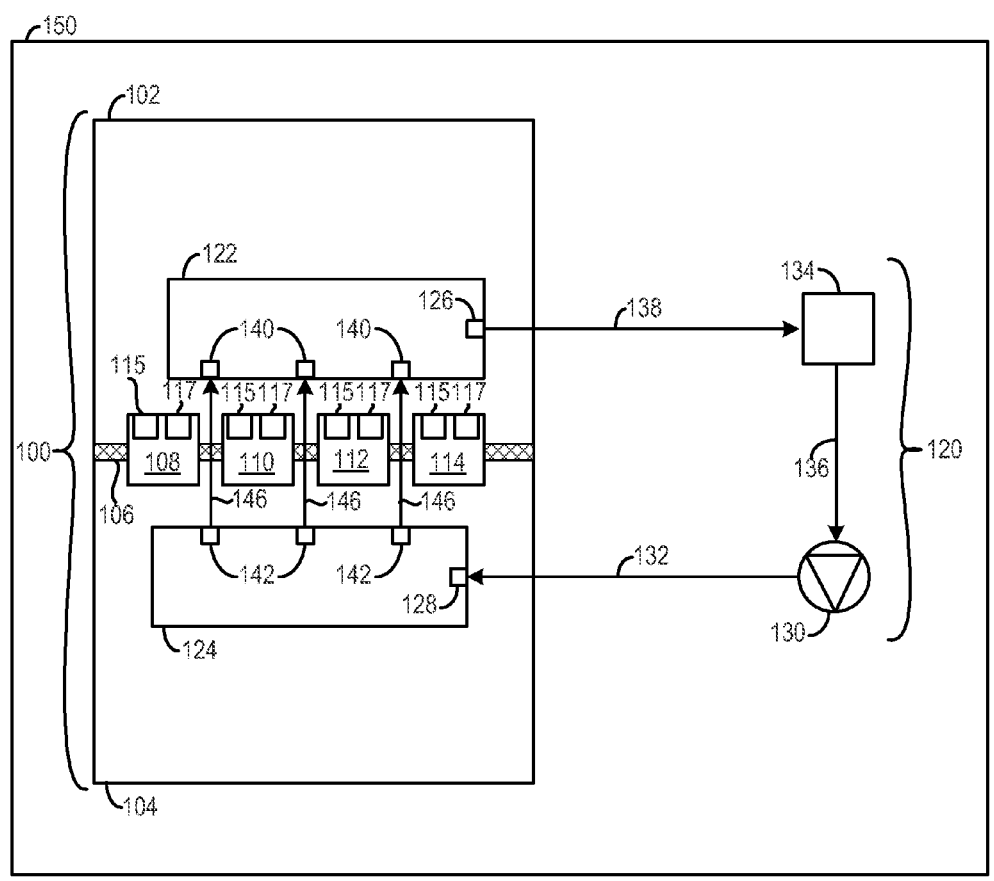
FIG. 1 shows a schematic depiction of an engine assembly.

FIG. 1 shows a schematic depiction of an engine assembly 100 included in a vehicle 150. The engine assembly 100 includes a cylinder head 102 and a cylinder block 104. A head gasket 106 is positioned between the cylinder head 102 and the cylinder block 104. Thus, the head gasket 106 interposes the cylinder head 102 and the cylinder block 104. Therefore, the head gasket 106 is sandwiched between the cylinder head 102 and the cylinder block 104. The head gasket 106 has additional features that are not depicted in FIG. 2. For example, the head gasket 106 may include coolant openings enabling coolant to pass through the head gasket 106. These and other additional features are shown in FIGS. 3-9 and described in greater detail herein.

The cylinder block 104 and the cylinder head 102 attach to form a first cylinder 108, a second cylinder 110, a third cylinder 112, and a fourth cylinder 114. The cylinders (108 and 114) may be referred to as peripheral cylinders. On the other hand, cylinders (110 and 112) may be referred to as interior cylinders. In the embodiment depicted in FIG. 2, the engine assembly 100 includes four cylinders. However, in other embodiments an alternate number of cylinders may be used. As shown, the cylinders (108, 110, 112, and 114) are in an inline configuration. That is to say a straight line passes through the central axis of each cylinder. However, other cylinder layouts have been contemplated. Each cylinder may include at least one intake valve 115 and at least one exhaust valve 117. Additionally, ignition devices, such as spark plugs, may be coupled to the cylinders to facilitate combustion. Furthermore, fuel injectors may be directly coupled to the cylinders. Additionally or alternatively, the engine may utilize compression ignition and/or fuel injectors may be positioned upstream of the cylinders. The cylinders may be coupled to a crankshaft, which may be coupled to a transmission.

The engine assembly 100 further includes a cooling system 120. The cooling system may include a cylinder head water jacket 122 and a cylinder block water jacket 124. The cylinder head water jacket 122 includes a plurality of coolant passages traversing the cylinder head 102 Likewise, the cylinder block water jacket 124 includes a plurality of coolant passages traversing the cylinder block 104. At least some of the coolant passages in the cylinder head water jacket 122 may be in fluidic communication with coolant passages in the cylinder block water jacket 124. The head gasket 106 may include coolant openings configured to accommodate the flow of coolant from the cylinder head water jacket 122 to the cylinder block water jacket 124 or vice-versa.

As shown, the cylinder head water jacket 122 includes at least one coolant outlet 126. The coolant outlet 126 may be an outlet of at least one coolant passage. Additionally, the cylinder block water jacket 124 includes at least one coolant inlet 128. The coolant inlet 128 may be the inlet of at least one coolant passage. However, in other examples, each of the cylinder head water jacket 122 and the cylinder block water jacket 124 may include a coolant inlet and a coolant outlet or the cylinder head water jacket 122 may include a coolant inlet and the cylinder block water jacket 124 may include a coolant outlet.

The cooling system 120 includes a pump 130 in fluidic communication with the coolant outlet 126 and the coolant inlet 128. The pump 130 is configured to increase the head pressure in the coolant circuit. In this way, coolant may be circulated through the cylinder block water jacket 124 and the cylinder head water jacket 122. Arrow 132 denotes the flow of coolant from the pump 130 to the coolant inlet 128. In this way, coolant may flow through one or more coolant passages.

The cooling system 120 also includes a heat exchanger 134 (e.g., radiator). The heat exchanger 134 is in fluidic communication with the pump 130 and the coolant outlet 126. The heat exchanger 134 is configured to remove heat from coolant in the cooling system 120. Specifically, the heat exchanger 134 may be configured to transfer heat to the surrounding air. However in other examples, the heat exchanger may transfer heat to another fluid.

Arrow 136 denotes the flow of coolant from the heat exchanger 134 to the pump 130. Additionally, arrow 138 denotes the flow of coolant from the coolant outlet 126 to the heat exchanger 134. In this way, coolant may be circulated through the cooling system 120 via coolant passages.

Coolant may flow between the cylinder head water jacket 122 and the cylinder block water jacket 124. Specifically, coolant may travel from a plurality of coolant passage outlets 142 in the cylinder block water jacket 124 to a plurality of coolant passage inlets 140 in the cylinder head water jacket 124. Arrows 146 denote the flow of coolant from the cylinder block water jacket 124 to the cylinder head water jacket 122 through the head gasket 106. Columns of openings for coolant flow may be included in the head gasket 106 to enable coolant to flow therethrough. The columns of coolant openings are discussed in greater detail herein with regard to FIGS. 3-9.

Figure 2:
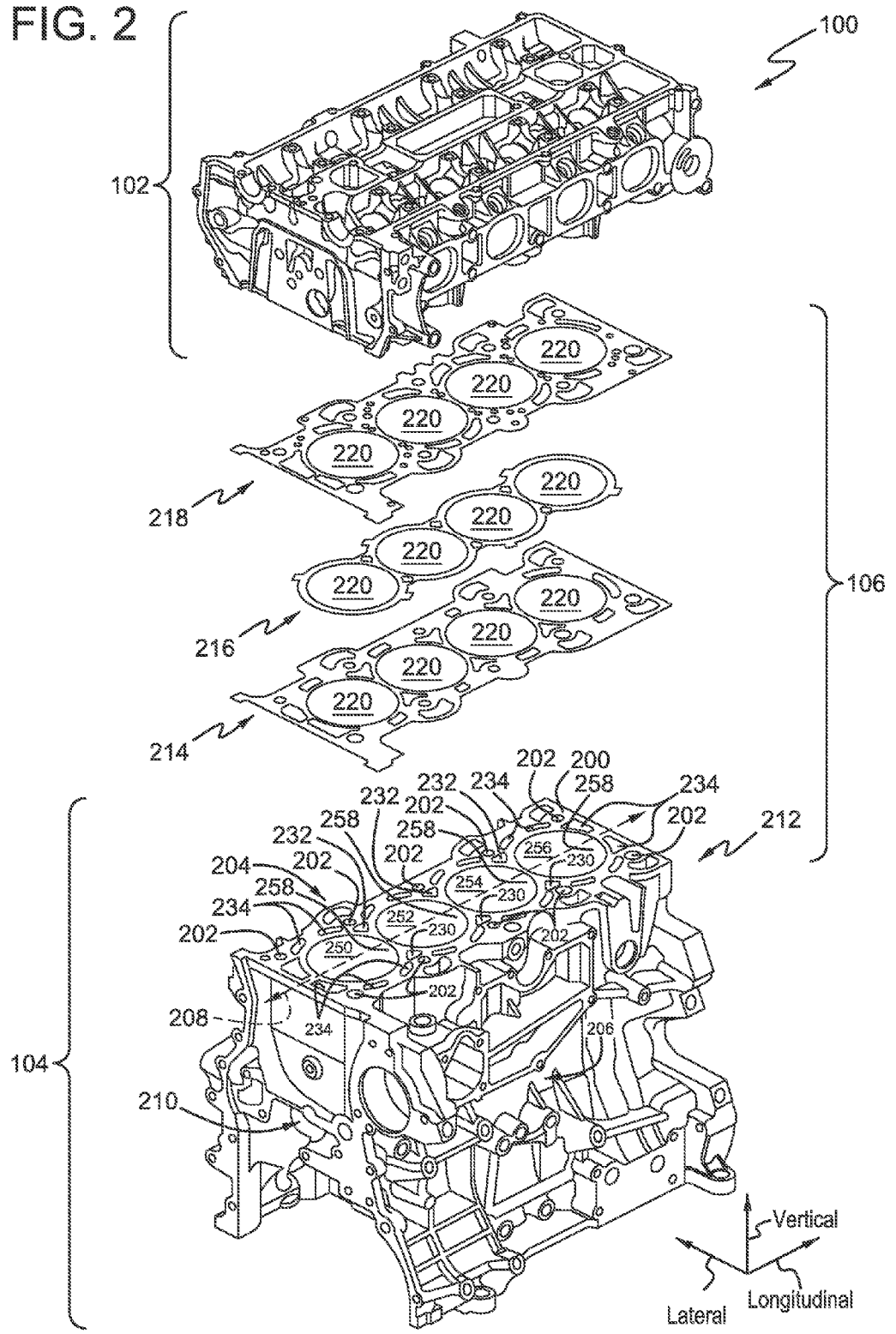
FIG. 2 shows an exploded view of an example engine assembly.
Figure 3:
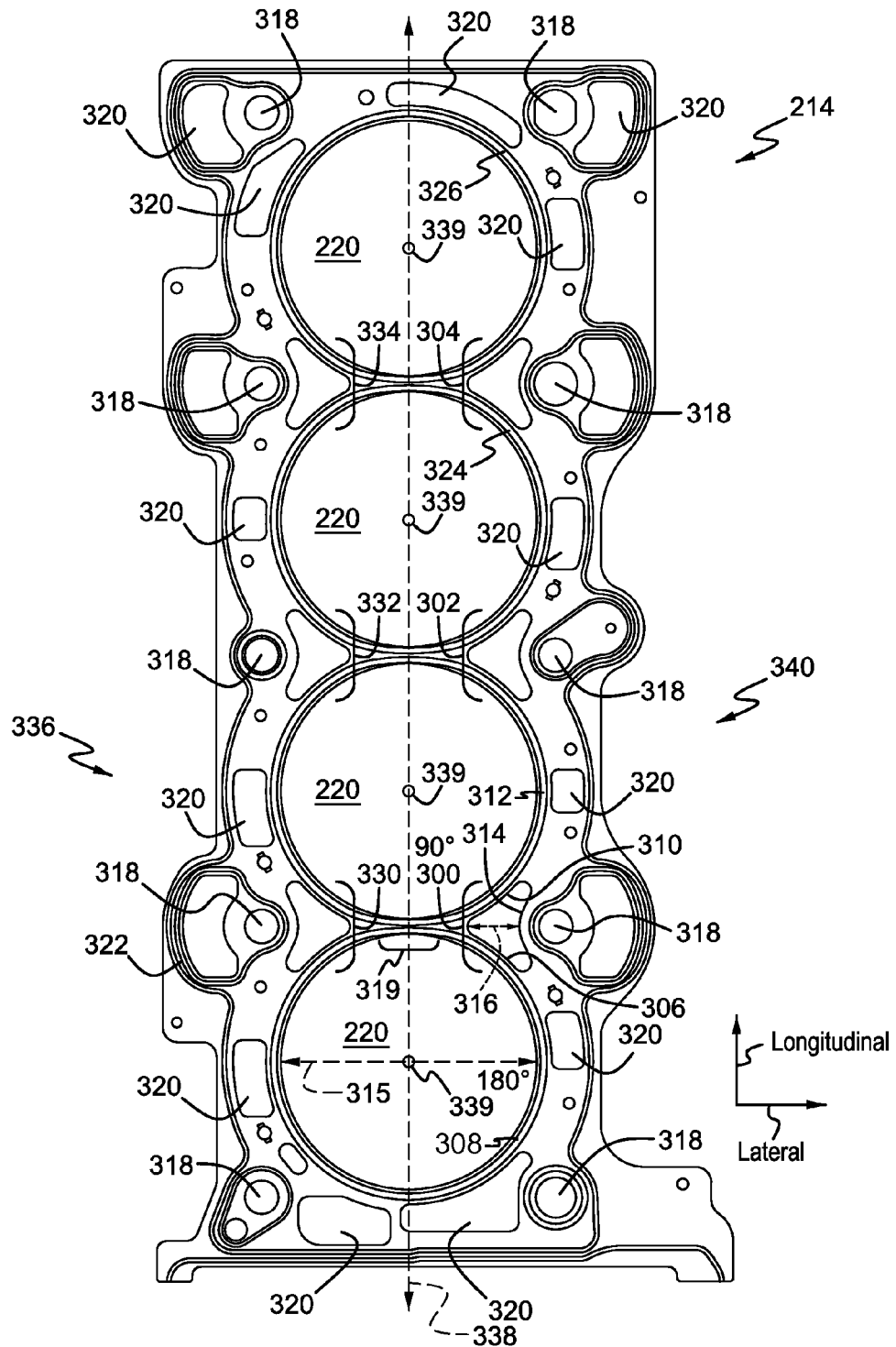
FIG. 3 shows an exterior block interfacing layer included in the head gasket of the engine assembly shown in FIG. 2.

FIG. 2 shows an exploded view of an example engine assembly 100 shown in FIG. 2. The cylinder head 102 and the cylinder block 104 in the engine assembly are shown. A first cylinder section 250, a second cylinder section 252, a third cylinder section 254, and a fourth cylinder section 256 included in the cylinder block 104 are also shown in FIG. 3. It will be appreciated that the first cylinder section 250 is included in the first cylinder 108 shown in FIG. 1. Likewise, the second cylinder section 252 is included in the second cylinder 110 shown in FIG. 1, the third cylinder section 254 is included in the third cylinder 112, and the fourth cylinder section 256 is included in the fourth cylinder 114. Continuing with FIG. 2, each of the cylinder sections (250, 252, 254, and 256) include walls 258 defining the boundary of each respective cylinder.

Figure 8:
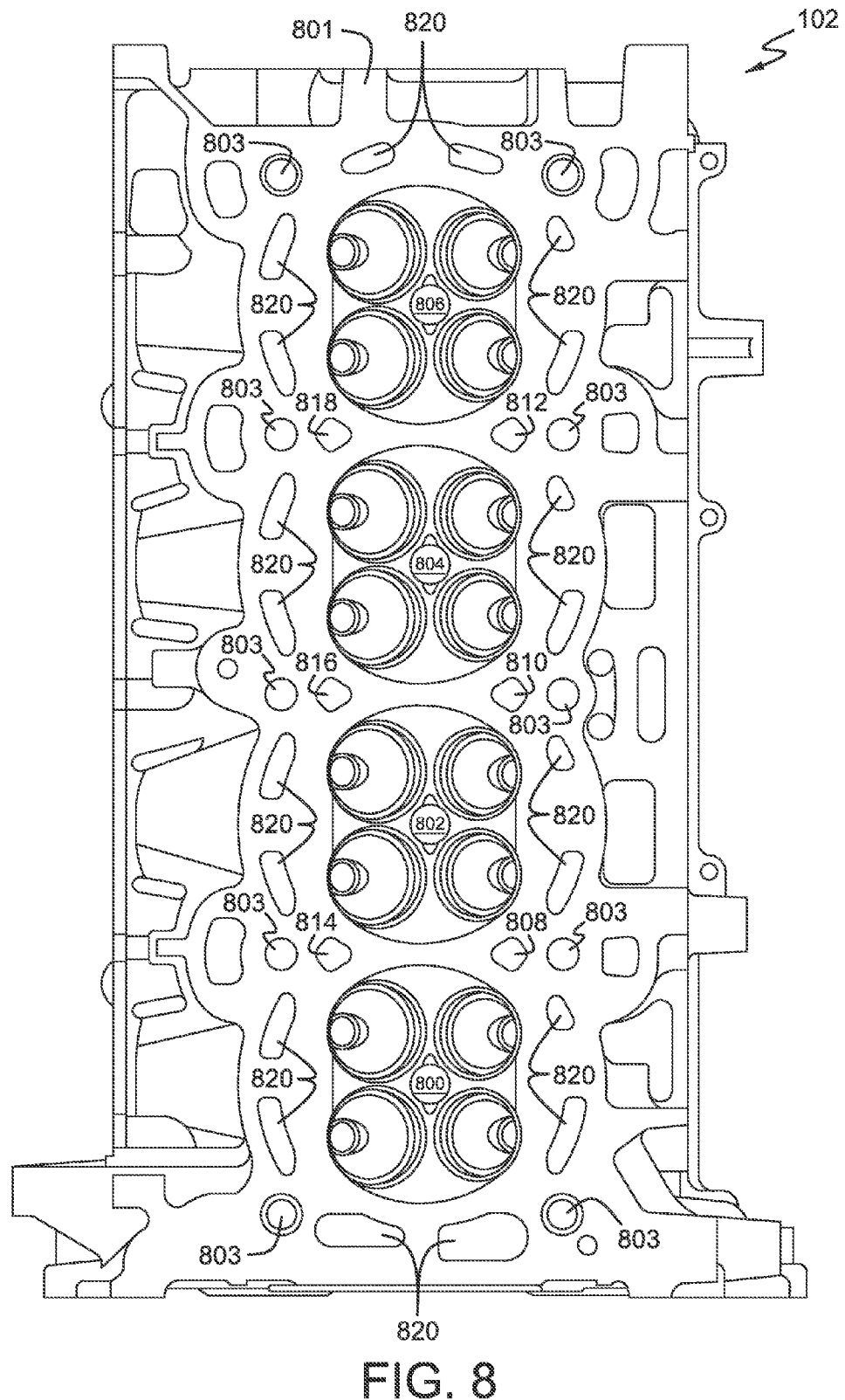
FIG. 8 shows a bottom view of the cylinder head shown in the engine assembly illustrated in FIG. 2.

The cylinder head 102 includes a cylinder block attachment surface 801, shown and further described in FIG. 8. Likewise, the cylinder block 104 includes a cylinder head attachment surface 200. The cylinder head attachment surface 200 includes attachment bores 202. The attachment bores 202 are positioned on an intake side 204 of the cylinder block 104 and an exhaust side 206 of the cylinder block 104. In one example, the attachment bores 202 on the intake side 204 of the cylinder block 104 may be configured to receive dowels. The dowels are used to fix the relative position of the cylinder head 102 and the cylinder block 104. Continuing with the example, the attachment bores on the exhaust side 206 may be configured to receive bolts. In this example, the attachment bores on the exhaust side 206 may be referred to as mounting holes. Specifically, the cylinder block 104 may include ten mounting holes. The mounting holes may be concentric to the attachment bores. However other configurations have been contemplated. For example, the attachment bores on the exhaust side 206 may be configured to receive dowels and the attachment bores on the intake side 204 may be configured to receive bolts or a portion of the attachment bores on both the intake side 204 and exhaust side 206 may be configured to receive dowels and another portion of the attachment bores on the intake side and the exhaust side may be configured to receive bolts. In another example, all of the attachment bores 202 may be bolt holes An axis 208 extending longitudinally down the cylinder block 104 may be the boundary dividing the cylinder block 104 as well as the engine assembly 100 into an intake side and an exhaust side. The axis 208 extends through the central axis of each cylinder. The engine assembly 100 also includes bore bridges. Bore bridges are areas on both the cylinder block attachment surface 801, shown in FIG. 8, and the cylinder head attachment surface 200 that extend between attachment bores on opposing sides of the engine assembly 100. Thus, the bore bridges extend between neighboring cylinders.

The cylinder block 104 may also include a front side 210 and a rear side 212. The attachment bores 202 may be configured to receive dowels, bolts, or other suitable attachment apparatuses for coupling the cylinder head 102 to the cylinder block 104 or fixing the relative position of the cylinder head and the cylinder block. The attachment bores 202 are laterally positioned between the cylinders sections (250, 252, 254, and 256). A lateral, longitudinal, and vertical axis are provided for reference.

The cylinder block 104 further includes a plurality of cylinder block coolant passage outlets. The cylinder block coolant passage outlets direct coolant into a column of coolant openings in the head gasket 106. Coolant then flows from the column of coolant openings to coolant passages in the cylinder head water jacket 122, shown in FIG. 1. In particular, a first set of cylinder block coolant passage outlets 230 is positioned on the exhaust side 206 of the cylinder block 104. Specifically, the first set of cylinder block coolant passage outlets 230 includes an outlet positioned between the first and second cylinder sections (250 and 252), an outlet positioned between the second and third cylinder sections (252 and 254), and an outlet positioned between the third and fourth cylinder sections (254 and 256). A second set of cylinder block coolant passage outlets 232 is positioned in the intake side 204 of the cylinder block 104. The first and second set of cylinder block coolant passage outlets (230 and 232) may be included in the plurality of coolant passage outlets 142, shown in FIG. 1. Thus, the coolant passage outlets (230 and 232) may be included in the cylinder block water jacket 124. The first and second set of coolant passage outlets may flow coolant into openings in the head gasket 106.

The second set of cylinder block coolant passage outlets 232 includes an outlet positioned between the first and second cylinder sections (250 and 252), an outlet positioned between the second and third cylinder sections (252 and 254), and an outlet positioned between the third and fourth cylinder sections (254 and 256). It will be appreciated that the first set of cylinder block coolant passage outlets 230 is mirrored by the second set of cylinder block coolant passage outlets 232 about the axis 208. Thus, the first set of coolant passage outlets 230 has a similar size and geometry to the second set of coolant passage outlets 232. However, other inlet locations and configurations have been contemplated. The cylinder block 104 may include additional cylinder block coolant passage outlets 234 positioned around the periphery of the cylinder sections (250, 252, 254, and 256).

The head gasket 106 interposes the cylinder head 102 and the cylinder block 104. The head gasket 106 provides sealing to the cylinders (108, 110, 112, and 114), shown in FIG. 1, to reduce the likelihood of coolant leaking into the cylinders. The head gasket 106 includes a plurality of layers. Specifically, the head gasket 106 includes an exterior block interfacing layer 214, an interior layer 216, and an exterior head interfacing layer 218. The exterior block interfacing layer 214 may be in face sharing contact with the cylinder block 104, when the engine assembly 100 is assembled. Likewise, the exterior head interfacing layer 118 may be in face sharing contact with the cylinder head 102, when the engine assembly 100 is assembled.

The exterior block interfacing layer 214 may be referred to as a first layer, the interior layer 216 may be referred to as a second layer, and the exterior head interfacing layer 218 may be referred to as a third layer. Each of the layers (214, 216, and 218) includes cylinder openings 220. The cylinder openings 220 align with the cylinder sections (250, 252, 254, and 256). In this way, the head gasket 106 enables the sections of the cylinders in both the cylinder block 104 and the cylinder head 102 to be in direct fluidic communication, thereby forming complete cylinders. Each of the layers in the head gasket 106 may also include a plurality of coolant openings enabling coolant to flow through the head gasket from coolant passages in the cylinder block 104 to coolant passages in the cylinder head 102. Specifically, coolant openings in each of the layers may form a column of coolant openings extending through the head gasket 106. The coolant openings and columns of coolant openings are labeled in FIGS. 3-8 and discussed in greater detail herein.

The exterior block interfacing layer 214 may comprise embossed stainless steel with rubber coating at the embossments (e.g., sealing beads) in some embodiments. The interior layer 216 may comprise carbon steel and/or stainless steel. It will be appreciated that the interior layer 216 is not embossed in the depicted embodiment. The exterior cylinder interfacing layer 218 may comprise embossed stainless steel with rubber coating at the embossments (i.e., sealing beads). Thus, the interior layer 216 in the head gasket 106 may include different materials than the exterior block interfacing layer 214 and the exterior head interfacing layer 218. It will be appreciated that the head gasket 106 may include additional layers that are not depicted in other embodiments. For example, the head gasket 106 may include a plurality of interior layers having aligned coolant openings. FIG. 3 shows a top view of the exterior block interfacing layer 214. The exterior block interfacing layer 214 includes a first set of block interfacing layer coolant openings having a plurality of coolant openings. The block interfacing layer coolant openings in the first set include a first block interfacing layer coolant opening 300, a second block interfacing layer coolant opening 302, and a third block interfacing layer coolant opening 304. It will be appreciated that the coolant openings 300, 302, and 304 are larger than the corresponding openings in other head gasket layers. As a result, an increased amount of coolant is enabled to flow closer to the periphery of the cylinders, thereby increasing cylinder cooling. Further, it will be appreciated that coolant may be flowed from coolant passage outlets in the cylinder block, through the first set of coolant openings, and into coolant passage inlets in the cylinder head. Specifically, the first coolant opening 300 is adjacent to the first cylinder 108 and the second cylinder 110, shown in FIG. 1, when the engine assembly 100 is assembled Likewise, the second coolant opening 302 is adjacent to the second cylinder 110 and the third cylinder 112, shown in FIG. 1 and the third coolant opening 304 is adjacent to the third cylinder 112 and the fourth cylinder 114, shown in FIG. 1. The first, second, and third coolant openings (300, 302, and 304) are substantially identically in size and geometry. Therefore, it will be appreciated that the following description of the first coolant opening 300 also applies to the second coolant opening 302 and the third coolant opening 304. However, alternate sizes and geometries have been contemplated.

The first block interfacing layer coolant opening 300 includes a first edge 306 traversing a first cylinder sealing bead 308. The first cylinder sealing bead 308 extends around the periphery of the first cylinder 108, shown in FIG. 1, when the engine assembly 100 is assembled. Sealing beads act as sealing interfaces. Thus, before the engine assembly is assembled the sealing bead 308 may be embossed (e.g., raised) and uncompressed. When assembled the beads may be compressed, forming a seal with the cylinder block 104. The cylinder sealing bead reduces the likelihood of coolant flowing into the first cylinder and/or combustion gas flowing out of the first cylinder. The first edge 306 is concave. In particular, the first edge 306 has a curvature that is contoured to mate with a wall 258, shown in FIG. 2, of the first cylinder 108, shown in FIG. 1. It will be appreciated that the cylinder block 104 may be provided with increased cooling when the first coolant opening 300 is shaped in this way, thereby reducing the likelihood of thermal degradation of the cylinder block.

Likewise, the first block interfacing layer coolant opening 300 includes a second edge 310 traversing a second cylinder sealing bead 312. The second cylinder sealing bead 312 extends around the periphery of the second cylinder 110, show in FIG. 1, when the engine assembly 100 is assembled. The second edge 310 is also concave and has a curvature that is contoured to mate with a wall 258, shown in FIG. 2, of the second cylinder 110, shown in FIG. 1. Thus, the first block interfacing layer coolant opening 300 extends from the first cylinder sealing bead 308 to the second cylinder sealing bead 312. In this way, the size of the coolant opening is increased when compared to coolant openings that do not extend between the cylinder sealing beads. As a result, cooling of the cylinder block 104, shown in FIG. 2, may be increased.

Furthermore, the first block interfacing layer coolant opening 300 includes a third edge 314 that is concave. The first block interfacing layer coolant opening 300 is symmetric about an axis 315. The symmetry enables more evenly distributed cooling to be provided to the cylinder block 104, shown in FIG. 2. As a result, the likelihood of warping or other types of thermal degradation may be decreased. In the depicted embodiment, the first block interfacing layer coolant opening 320 is positioned between 140°-170° with regard to an axis 315 extending laterally through a central axis 339 of the first cylinder 108. 90° AND 180° are provided for reference in FIG. 3. It has been found unexpectedly that when the block interfacing layer coolant openings have the aforementioned geometry a coolant flow patterns conducive to removing an increased amount of heat from the cylinder block are generated.

As shown, the first cylinder sealing bead 308 and the second cylinder sealing bead 312 include an adjoining portion 319. When the sealing beads and therefore the cylinders are positioned in this way the compactness of the engine assembly 100 is increased when compared to engine assemblies which may have a large separation between neighboring cylinders. However, other types of cylinder spacing have been contemplated.

The exterior block interfacing layer 214 further includes a second set of block interfacing layer coolant openings including a fourth block interfacing layer coolant opening 330, a fifth block interfacing layer coolant opening 332, and a sixth block interfacing layer coolant opening 334. As shown, the second set of block interfacing layer coolant openings (330, 332, and 334) has a similar geometry to the first set of block interfacing layer coolant openings (300, 302, and 304) but is positioned on an exhaust side 336 of the exterior block interfacing layer 214. Axis 338 is the line dividing the exterior block interfacing layer 214 into an exhaust side 336 and an intake side 340. The axis 338 extends through the central axes 339 of each of the cylinder opening 220. Coolant may flow through the second set of coolant openings from coolant passage outlets in the cylinder block 104 to coolant passage inlets in the cylinder head 102, shown in FIG. 2.

Continuing with FIG. 3, the exterior block interfacing layer 214 further includes bolt holes 318. The bore openings are configured to accept bolts or suitable attachment apparatuses when the cylinder head 102 and the cylinder block 104, shown in FIG. 2, are attached. The first set of block interfacing layer coolant openings (300, 302, and 304) and the second set of block interfacing layer coolant openings (330, 332, and 334) are positioned between the bolt holes 318. Specifically, the block interfacing layer coolant opening 300 and the block interfacing layer coolant opening 330 are positioned between two laterally opposing bore openings and therefore the laterally opposing attachment bores 202 and/or bolt openings, shown in FIG. 2. Likewise, the block interfacing layer coolant openings (302 and 332) and (304 and 334) are also positioned between two laterally opposing attachment bores and/or bolt openings. A lateral axis and a longitudinal axis are provided for reference.

Additional block interfacing layer coolant openings 320 included in the exterior block interfacing layer 214 are also depicted. It will be appreciated that coolant may be flowed through the block interfacing layer coolant openings 320 from coolant passage outlets in the cylinder block 104 to coolant passage inlets in the cylinder head 102, shown in FIG. 2.

A peripheral sealing bead 322 is also included in the exterior block interfacing layer 214. The peripheral sealing bead 322 extends around the exterior block interfacing layer 214 and encloses the cylinder openings 220 included in the exterior block interfacing layer 214. The exterior block interfacing layer 214 further includes a third cylinder sealing bead 324 and a fourth cylinder sealing bead 326.

It will be appreciated that the peripheral sealing bead 322, the first cylinder sealing bead 308, the second cylinder sealing bead 312, the third cylinder sealing bead 324, and the fourth cylinder sealing bead 326 may be in face sharing contact with the cylinder head attachment surface 200 when the engine assembly 100 shown in FIG. 2 is assembled.

Figure 4:
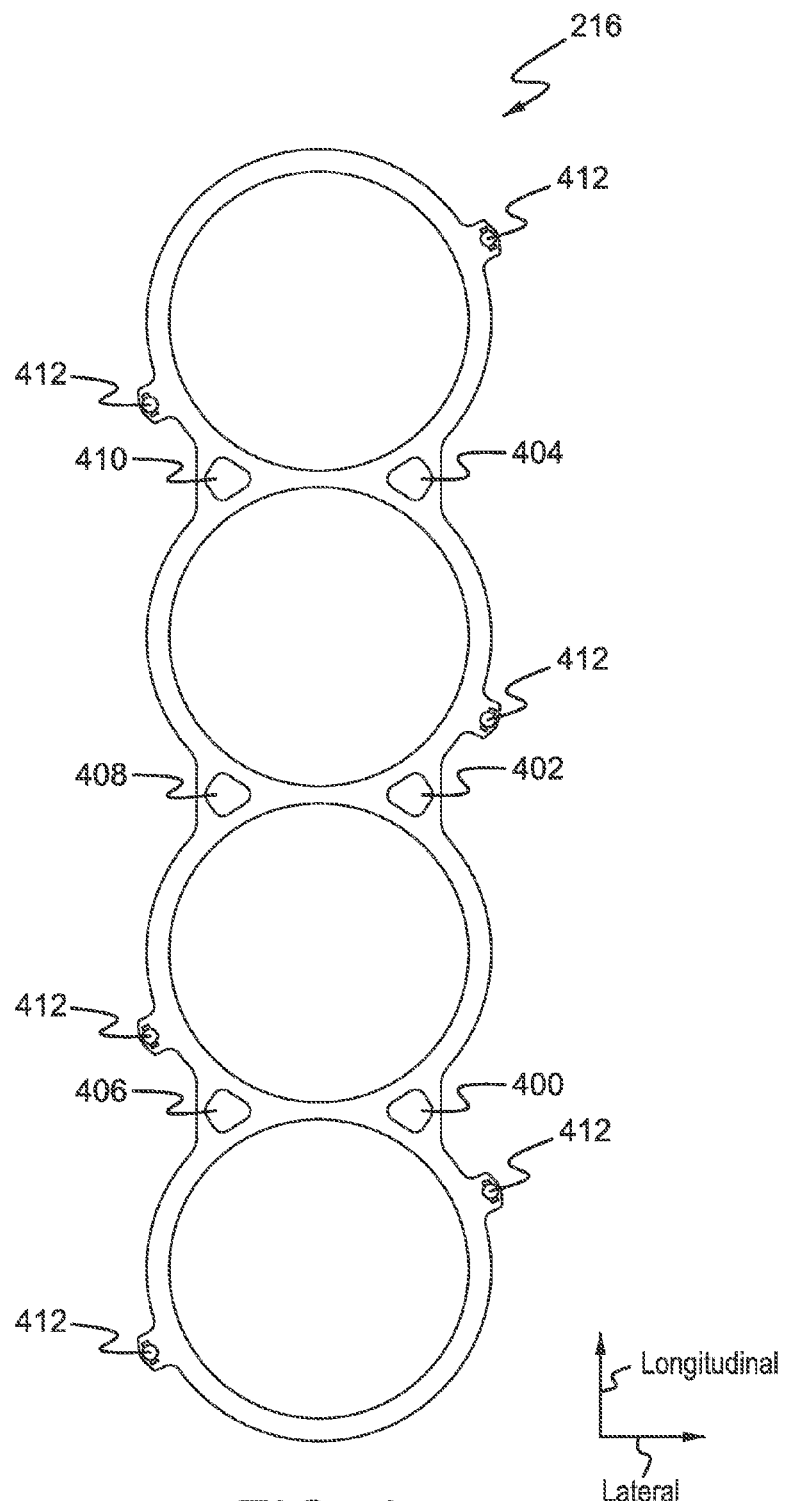
FIG. 4 shows an interior layer included in the head gasket of the engine assembly shown in FIG. 2.

FIG. 4 shows a top view of the interior layer 216. The interior layer 216 includes a first set of interior layer coolant openings including a first interior layer coolant opening 400, a second interior layer coolant opening 402, and a third interior layer coolant opening 404. The first interior layer coolant opening 400 may be vertically aligned with the first block interfacing layer coolant opening 300, shown in FIG. 3. Likewise, the second and third interior layer coolant openings (402 and 404) may each be vertically aligned with block interfacing layer coolant openings.

The interior layer 216 further includes a second set of interior layer coolant openings including a fourth interior layer coolant opening 406, a fifth interior layer coolant opening 408, and a sixth interior layer coolant opening 410.

Each of the interior layer coolant openings included in the first and second sets of interior layer coolant openings have a similar size and geometry. However, the size and/or geometry may vary between the interior layer coolant openings. The first interior layer coolant opening 400 has a smaller cross-sectional area than the first block interfacing layer coolant opening 300. The interior layer 216 further includes attachment sections 412. The attachment sections 412 may be raised and configured to mate with recesses in the exterior block interfacing layer 214.

Figure 5:
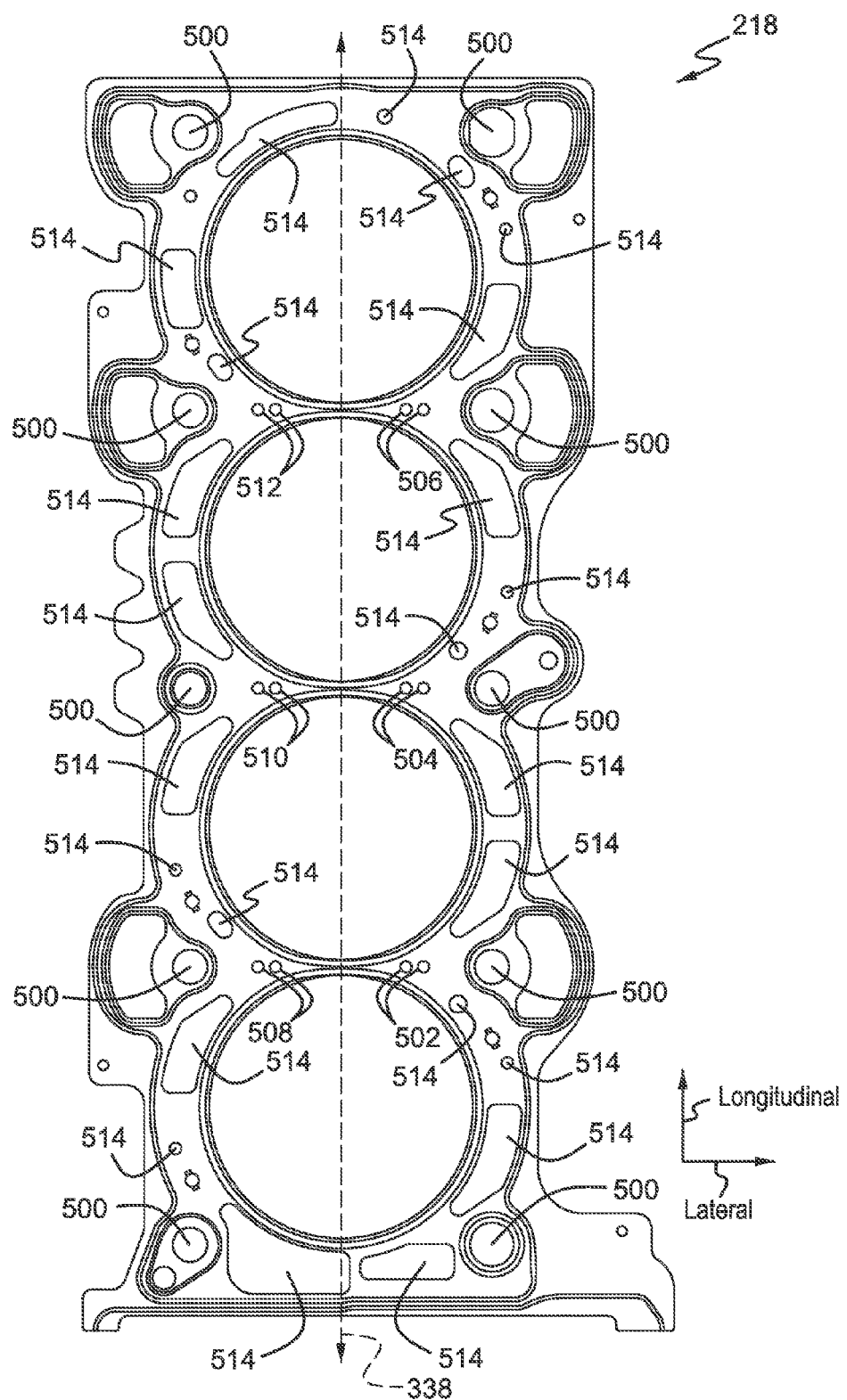
FIG. 5 shows an exterior head interfacing layer included in the head gasket of the engine assembly shown in FIG. 2.

FIG. 5 shows a top view of the exterior head interfacing layer 218. The exterior head interfacing layer include bolt holes 500. The bore openings 500 may be configured to receive bolts or other suitable attachment devices coupling the cylinder head 102 to the cylinder block 104, shown in FIG. 2, when assembled.

The exterior head interfacing layer 218 also includes a first set of head interfacing layer coolant openings including a first pair of head interfacing layer coolant openings 502, a second pair of head interfacing layer coolant openings 504, and a third pair of head interfacing layer coolant openings 506.

The exterior head interfacing layer also comprises a second set of head interfacing layer coolant openings including a fourth pair of head interfacing layer coolant openings 508, a fifth pair of head interfacing layer coolant openings 510, and a sixth pair of head interfacing layer coolant openings 512. Each of the head interfacing layer coolant openings included in the exterior head interfacing layer has a similar size and geometry. However, varying sizes and/or geometries have been contemplated. It will be appreciated that coolant may flow through the interior layer coolant openings from coolant passage outlets in the cylinder block shown in FIG. 2. The first pair of head interfacing layer coolant openings 502 is vertically aligned with the first interior layer coolant opening 400 and the first block interfacing layer coolant opening 300. Thus, coolant may flow between the aforementioned openings. Additionally, the first pair of head interfacing layer coolant openings 502 has a smaller cross-sectional area than the first interior layer coolant opening 400, shown in FIG. 4. Thus, the cross-sectional area of corresponding coolant openings in the head gasket 106, shown in FIG. 2, decrease in a downstream direction. In the depicted embodiment, the outer head interfacing coolant opening in each pair opens to coolant inlets in the cylinder head 102, thereby providing metering to the coolant entering the cylinder head 102. Thus, each of the outer head interfacing coolant openings is in fluidic communication with a corresponding coolant inlet in the cylinder head. The outer head interfacing coolant openings are the coolant openings father away from the axis 338. On the other hand, the inner head interfacing coolant opening in each pair are masked and do not open into coolant inlets in the cylinder head 102. The inner head interfacing coolant opening in each pair provide a larger column of water to extract heat from the cylinder block 104. However in other examples, both openings in each pair of head interfacing coolant openings may provide metering to coolant entering the cylinder head 102. The pairs of head interfacing layer coolant openings are also laterally aligned. However, other alignments have been contemplated.

The head interfacing layer 218 includes additional head interfacing layer coolant openings 514 configured to flow coolant therethrough to coolant passage inlets included in the cylinder head 102, shown in FIG. 2.

Figure 6:
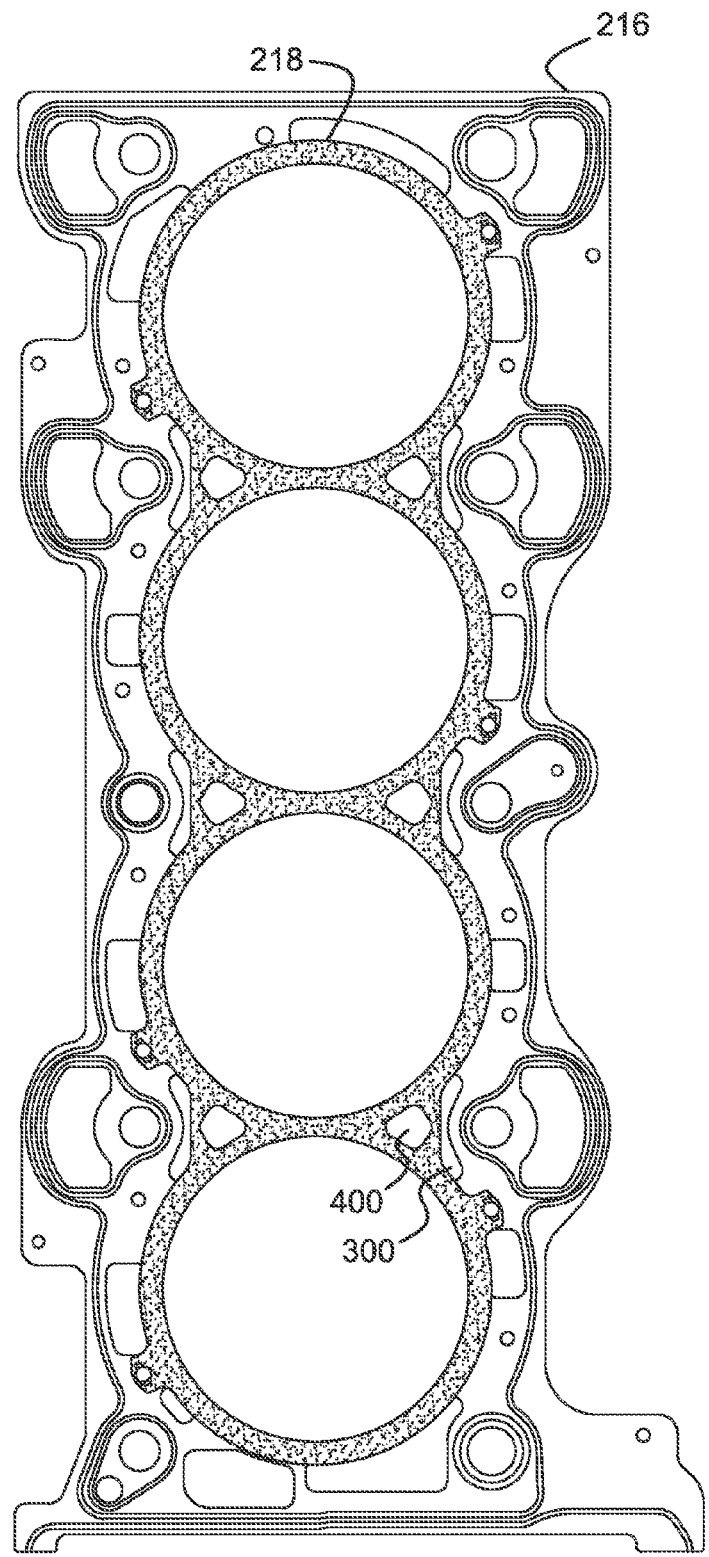
FIG. 6 shows the interior layer and the exterior block interfacing layer in the head gasket assembled.

FIG. 6 shows the exterior block interfacing layer 214 and the interior layer 216 assembled. As shown, the cross-sectional area of the first block interfacing layer coolant opening 300 is larger than the cross-sectional area of the first interior layer coolant opening 400. The increase in cross-sectional area may be due at least in part to manufacturing constraints. Moreover, the first block interfacing layer coolant opening 300 and the first interior layer coolant opening 400 are vertically aligned. Additionally, first interior layer coolant opening 400 and the first block interfacing layer coolant opening 300 at least partially overlap one another. It will be appreciated that the first pair of head interfacing layer coolant openings 502, shown in FIG. 5, and the first interior layer coolant opening 400 may also at least partially overlap one another.

Figure 7:
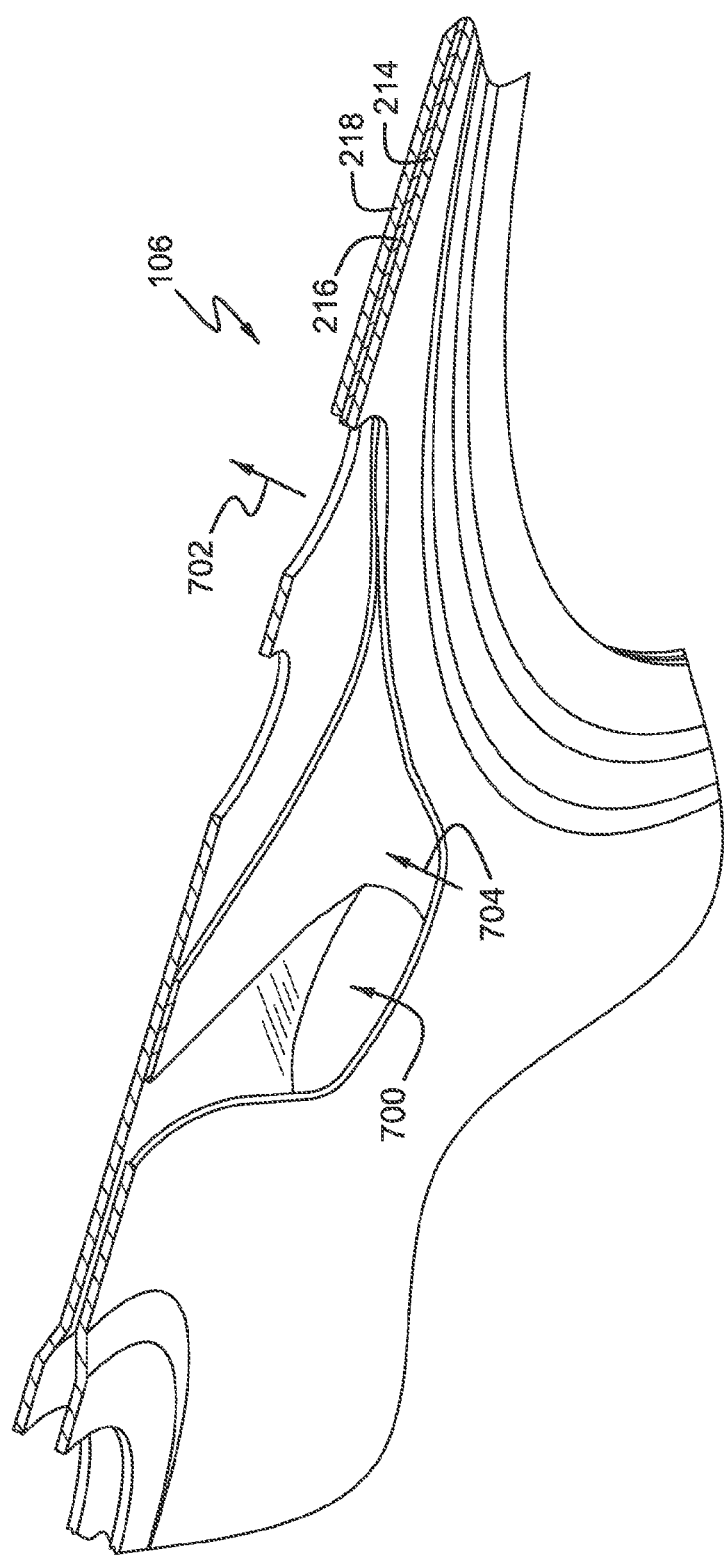
FIG. 7 shows a cross-sectional view of the head gasket included in the engine assembly shown in FIG. 2.

FIG. 7 shows a cross-sectional view of the assembled head gasket 106. The exterior block interfacing layer 214, the interior layer 216, and the exterior head interfacing layer 218. The block interfacing layer coolant opening 330, the interior layer coolant opening 406, and the pair head interfacing layer coolant openings 508 form a column of coolant openings 700. It will be appreciated that coolant may flow through the column of coolant openings 700. The block interfacing layer coolant opening 330 may be in direct fluidic communication with the interior layer coolant opening 406 and the interior layer coolant opening 406 may be in direct fluidic communication with the pair head interfacing layer coolant openings 508. It will be appreciated that direct fluidic communication is defined as flowing fluid directly from one component to another without any intervening components positioned therebetweeen.

Arrow 704 denotes the general flow of coolant from the one of the coolant passage outlets 232 in the cylinder block 104, shown in FIG. 2, to the column of coolant openings 700. Likewise, arrow 702 denotes the general flow of coolant from the column of coolant openings 700 to a coolant passage inlet 814 in the cylinder head 102, shown in FIG. 8. It will be appreciated that coolant flow into and out of the column of coolant openings may have additional complexity that is not depicted. Moreover, each of the aligned coolant openings in layers of the head gasket may form similar columns of coolant openings.

FIG. 8 shows a bottom view of the cylinder head 102, shown in FIG. 2. The cylinder head 102 includes a cylinder block attachment surface 801 having attachment bores 803. The attachment bores 803 are configured to receive bolts, dowels, or other suitable attachment apparatuses that may couple the cylinder head 102 to the cylinder block 104, shown in FIG. 2. Therefore, in some examples, the attachment bore 803 may be bolt openings. The cylinder block attachment surface 801 may be in contact with a portion of the exterior head interfacing layer 218, when the engine assembly 100, shown in FIG. 2 is assembled.

Continuing with FIG. 8, the cylinder head 102 also includes a first cylinder section 800, a second cylinder section 802, a third cylinder section 804, and a fourth cylinder section 806. It will be appreciated that the first cylinder section 800 is included in the first cylinder 108, shown in FIG. 1. Likewise, the second cylinder section 802 is included in the second cylinder 110 shown in FIG. 1, the third cylinder section 804 is included in the third cylinder 112, and the fourth cylinder section 806 is included in the fourth cylinder 114. The cylinder head 102 further includes a first set of coolant passage inlets including a first coolant passage inlet 808, a second coolant passage inlet 810, and a third coolant passage inlet 812.

The cylinder head 102 additionally includes a second set of coolant passage inlets including a fourth coolant passage inlet 814, a fifth coolant passage inlet 816, and a sixth coolant passage inlet 818. It will be appreciated that the first and/or second set of coolant passage inlets may be included in the plurality of coolant passage inlets 140, shown in FIG. 1. Coolant may flow from the outer opening in the first pair of head interfacing layer coolant openings 502, shown in FIG. 5, to the first coolant passage inlet 808, during operation of the cooling system 120, shown in FIG. 1. Likewise, the second coolant passage inlet 808 receives coolant from the outer opening in the second pair of head interfacing layer coolant openings 502, shown in FIG. 5. It will be appreciated that the third, fourth, fifth, and sixth coolant passage inlets (812, 814, 816, and 818) receive coolant from the outer openings in each of the third, fourth, fifth, and sixth pairs of head interfacing coolant openings (506, 508, 510, and 512), shown in FIG. 5.

Additional coolant passage inlets 820 are shown in FIG. 8. It will be appreciated that the additional coolant passage inlets 820 receive coolant from openings in the head gasket 106, shown in FIG. 2.

Figure 9:
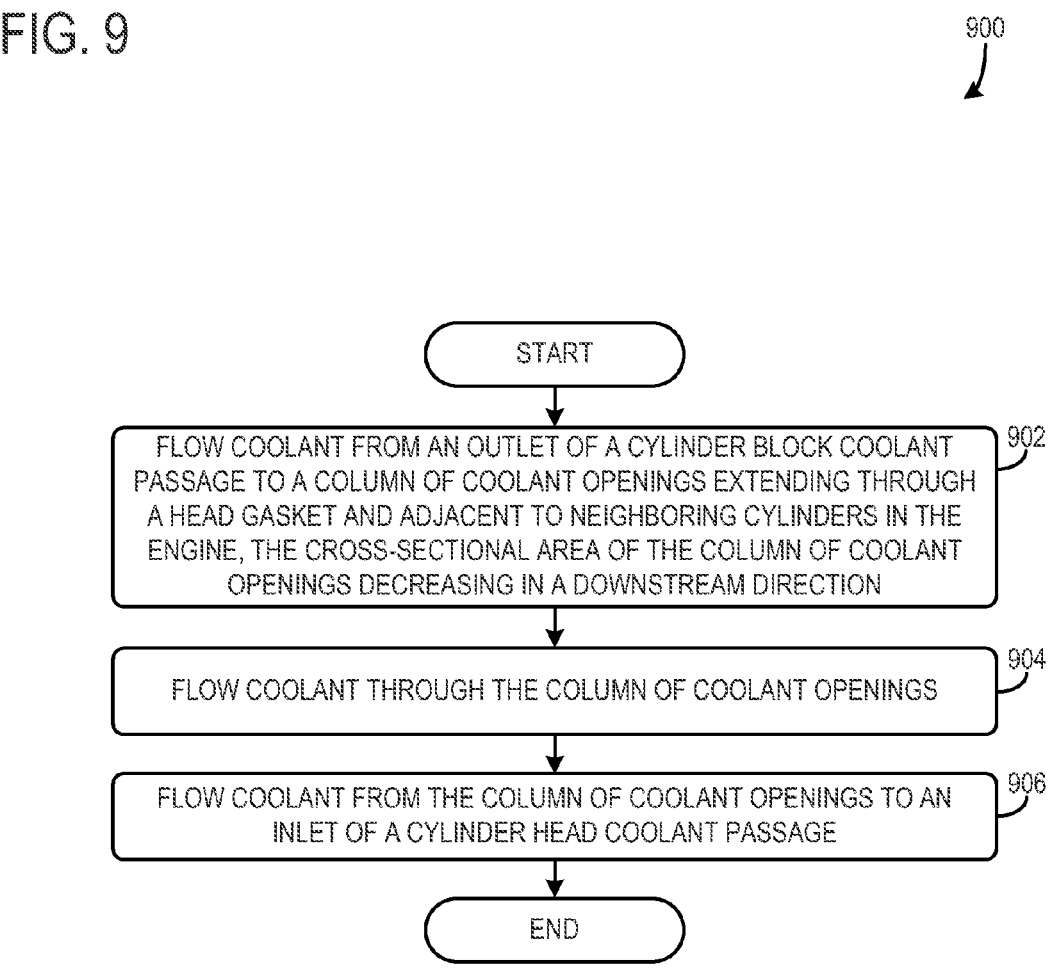
FIG. 9 shows a method for operation of an engine cooling system.

FIG. 9 shows a method 900 for operating an engine cooling system. The method 900 may be implemented via the engine assembly and components described above with regard to FIGS. 1-8 or may be implemented by other engine assemblies and components.

The method includes at 902 flowing coolant from an outlet of a cylinder head coolant passage to a column of coolant openings extending through a head gasket and adjacent to neighboring cylinders in the engine, the cross-sectional area of the column of coolant openings decreasing in a downstream direction. Flowing coolant through the column of coolant openings may includes flowing coolant through a block interfacing layer coolant opening included in an exterior block interfacing layer, an interior layer coolant opening included in an interior layer, and a head interfacing layer coolant opening included in an exterior head interfacing layer. In some examples, the block interfacing layer coolant opening may extend from a first cylinder sealing bead extending around the periphery of the first cylinder to a second cylinder sealing bead extending around the periphery of the second cylinder.

Next at 904 the method includes flowing coolant through the column of coolant openings and at 906 the method includes flowing coolant from the column of coolant openings to an inlet of a cylinder block coolant passage.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. An engine assembly comprising:
a head gasket interposing a cylinder block and a cylinder head, the head gasket comprising a first layer in face sharing contact with a portion of a cylinder head attachment surface included in the cylinder block and having a first-layer coolant opening adjacent to two neighboring cylinders and a second layer having a second-layer coolant opening having a smaller cross-sectional area than the first-layer coolant opening, where the first-layer coolant opening includes two concave edges, each edge adjacent to separate neighboring cylinders, each edge having a curvature contoured to mate with an edge of an adjacent cylinder.

2. The engine assembly of claim 1, where the first-layer coolant opening is in direct fluidic communication with the second-layer coolant opening.

3. The engine assembly of claim 2, where the first-layer coolant opening and the second-layer coolant opening at least partially overlap one another.

4. The engine assembly of claim 1, further comprising a third layer including a third-layer coolant opening in fluidic communication with a cylinder head coolant passage outlet, the third-layer coolant opening having a smaller cross-sectional area than the second-layer coolant opening.

5. The engine assembly of claim 1, where the first-layer coolant opening is positioned between 140°-170° with regard to an axis extending laterally through a central axis of each of the neighboring cylinders.

6. The engine assembly of claim 1, where the first-layer coolant opening and the second-layer coolant opening are in fluidic communication with, and sandwiched between, a coolant passage outlet in the cylinder head and a coolant passage inlet in the cylinder block.

7. The engine assembly of claim 1, where the first-layer coolant opening includes a first edge traversing a first cylinder sealing bead and a second edge traversing a second cylinder sealing bead, the first cylinder sealing bead included in the first layer and extending around a periphery of one of the neighboring cylinders and the second cylinder sealing bead included in the first layer and extending around a periphery of the other neighboring cylinder.

8. The engine assembly of claim 1, where the first layer includes a different material than the second layer.

9. The engine assembly of claim 1, where the first-layer coolant opening is symmetric about at least one axis.

10. A head gasket comprising:
an interior layer interposing an exterior head interfacing layer and an exterior block interfacing layer; and
a column of coolant openings in fluidic communication with an inlet of a cylinder head coolant passage and an outlet of a cylinder block coolant passage, the column extending through the exterior block interfacing layer, the interior layer, and the exterior head interfacing layer, and adjacent to two neighboring cylinders, a cross-sectional area of the coolant column decreasing in a downstream direction.

11. The head gasket of claim 10, where the column of coolant openings includes a block interfacing layer coolant opening included in the exterior block interfacing layer, an interior layer coolant opening included in the interior layer, and a head interfacing layer coolant opening included in the exterior head interfacing layer.

12. The head gasket of claim 11, where the interior layer coolant opening is positioned vertically above the block interfacing layer coolant opening, and the head interfacing layer coolant opening is positioned vertically above the interior layer coolant opening.

13. The head gasket of claim 11, where the block interfacing coolant opening traverses a first cylinder sealing bead in the exterior block interfacing layer enclosing the first cylinder and a second cylinder sealing bead in the exterior block interfacing layer enclosing the second cylinder.

14. The head gasket of claim 11, where the outlet of the cylinder block coolant passage has a smaller cross-sectional area than a cross-sectional area of the block interfacing layer coolant opening.

15. The head gasket of claim 11, where the block interfacing layer coolant opening includes two concave edges adjacent to separate cylinders, each edge having a curvature contoured to mate with an edge of an adjacent cylinder.

16. The head gasket of claim 10, where the column of coolant openings is positioned between a first bore and a second bore included in a cylinder block in face sharing contact with the exterior block interfacing layer, the first bore positioned on an intake side of the two cylinders and the second bore positioned on an exhaust side of the two cylinders.

17. A method for operating an engine cooling system comprising:
flowing coolant from an outlet of a cylinder block coolant passage to a column of openings extending through a head gasket and adjacent to neighboring cylinders in the engine, a cross-sectional area of the column of coolant openings decreasing in a downstream direction;
flowing coolant through the column; and
flowing coolant from the column to an inlet of a cylinder head coolant passage.

18. The method of claim 17, where flowing coolant through the column of coolant openings includes flowing coolant through a block interfacing layer coolant opening included in an exterior block interfacing layer, an interior layer coolant opening included in an interior layer, and a head interfacing layer coolant opening included in an exterior head interfacing layer.

19. The method of claim 18, where the block interfacing layer coolant opening extends from a first cylinder sealing bead extending around a periphery of the first cylinder to a second cylinder sealing bead extending around a periphery of the second cylinder.

* * * * *